(12) United States Patent
McCloskey et al.

(10) Patent No.: US 10,843,874 B2
(45) Date of Patent: Nov. 24, 2020

(54) INTEGRAL PIVOT/KING PIN FOR CONVEYOR

(71) Applicant: McCloskey International Limited, Keene (CA)

(72) Inventors: James Paschal McCloskey, Keen (CA); Robert M. Wanamaker, Keen (CA); Joseph Ashford, Keen (CA)

(73) Assignee: McCloskey International Limited, Ontario (CA)

( * ) Notice: Subject to any disclaimer, the term of this patent is extended or adjusted under 35 U.S.C. 154(b) by 0 days.

(21) Appl. No.: 15/640,062

(22) Filed: Jun. 30, 2017

(65) Prior Publication Data

US 2020/0262656 A1    Aug. 20, 2020

Related U.S. Application Data

(60) Provisional application No. 62/358,439, filed on Jul. 5, 2016.

(51) Int. Cl.
*B65G 41/00* (2006.01)

(52) U.S. Cl.
CPC ......... *B65G 41/008* (2013.01); *B65G 41/002* (2013.01); *B65G 2207/40* (2013.01)

(58) Field of Classification Search
CPC ............... B65G 41/008; B65G 41/002; B65G 2207/40; B65G 41/001; B65G 41/005
See application file for complete search history.

(56) References Cited

U.S. PATENT DOCUMENTS

| 4,383,697 A | 5/1983 | F'Geppert |
| 6,186,311 B1* | 2/2001 | Conner .................. B65G 21/14 198/300 |
| 6,929,113 B1* | 8/2005 | Hoover .................. B65G 21/14 198/313 |

(Continued)

*Primary Examiner* — Mark A Deuble
(74) *Attorney, Agent, or Firm* — Schwabe, Williamson & Wyatt, P.C.

(57) ABSTRACT

A mobile radial stacker for stockpiling bulk material is provided that includes a stacker frame, a linear conveyor mounted to the frame, the conveyor having a rear portion and a front portion and being designed to carry bulk material from a lower position adjacent the rear portion to a raised position adjacent the front portion, and a pair of wheels mounted to the frame to facilitate movement of the stacker around a work site or to another work site. Also provided is a pivot pad/king pin apparatus mounted to the stacker including an integral king pin and pivot pad that may be displaced from a first position with the king pin facing downward for engagement with a tractor fifth wheel to a second position with the pivot pad facing downward for placement on the ground for radial conveying operations. Another way to describe the depicted embodiments is a pivot pad/king pin apparatus that may be used with a radial stacker. The apparatus may include a body with a king pin and pivot pad integrally mounted into it. The apparatus may be rotatable between a first position with the king pin facing downward for engagement with a tractor fifth wheel to a second position with the pivot pad facing downward for placement on the ground for radial conveying operations.

14 Claims, 7 Drawing Sheets

(56) References Cited

U.S. PATENT DOCUMENTS

| | | | |
|---|---|---|---|
| 7,455,173 B1 * | 11/2008 | Fridman | B65G 21/14 |
| | | | 198/302 |
| 9,469,482 B2 * | 10/2016 | Lichtberger | B65G 47/58 |
| 10,138,071 B1 * | 11/2018 | McCloskey | B65G 41/002 |
| 2007/0101897 A1 * | 5/2007 | Stevick | B65G 41/008 |
| | | | 105/463.1 |
| 2013/0048465 A1 | 2/2013 | Friesen | |
| 2014/0367219 A1 * | 12/2014 | Houssian | A01D 87/00 |
| | | | 198/318 |

* cited by examiner

INTEGRAL PIVOT/KING PIN FOR CONVEYOR

CROSS REFERENCE TO RELATED APPLICATIONS

The present application claims priority to U.S. Provisional Patent Application No. 62/358,439, filed Jul. 5, 2016, entitled "INTEGRAL PIVOT/KING PIN FOR CONVEYOR" The entire disclosure of each of these provisional applications is incorporated by reference.

TECHNICAL FIELD

Embodiments herein relate to conveyors, usually of the belt-type, used to convey bulk material from a screening or crushing plant to a location where such material is stacked.

BACKGROUND

Portable radial stackers have been used for many years to stack bulk materials such as aggregate for road construction, grain and coal. Radial stackers, which swing around in a radius to stack material in an arc, permit substantially more material to be stacked than is possible using a conventional stationary stacker that permits only a conical stack. Telescoping radial stackers permit even more material to be stacked as the stacker is extended or retracted during conveying operations.

Radial stackers typically include a wheeled axle disposed between a hopper and the top of the stacker from which the material is discharged. These wheels permit the stacker to be swung in an arc, with the hopper including a pivot plate on which the stacker pivots. Some such stackers are telescoping so that material can be stacked in a plurality of arcs or perhaps even a continuous pile.

Radial stackers typically include a pivot pad at the rear end underneath a hopper for receiving bulk debris to be conveyed. Once conveying operations are completed and the stacker is to be trucked to another location, a king pin is mounted to the rear of the stacker in place of the pivot pad. The rear of the stacker can then be elevated and the king pin is positioned over and then engaged with the fifth wheel of a tractor for pulling the stacker down a roadway.

In order to keep the king pin and the pivot pad accessible for quick replacement, one with the other, the component not being used is typically stored in the rear of the stacker. While this is not the best place to store the king pin or the pivot pad because space is at a premium directly under or adjacent the hopper, this has proven to be the best place as it is close to where they need to be mounted in place. Because the pivot pad and king pin can be heavy and difficult to carry by hand, it is important that the unit not being used is positioned close to where it needs to be used.

BRIEF DESCRIPTION OF THE DRAWINGS

Embodiments will be readily understood by the following detailed description in conjunction with the accompanying drawings and the appended claims. Embodiments are illustrated by way of example, and not by way of limitation, in the figures of the accompanying drawings.

DETAILED DESCRIPTION OF DISCLOSED EMBODIMENTS

Figure 1A:
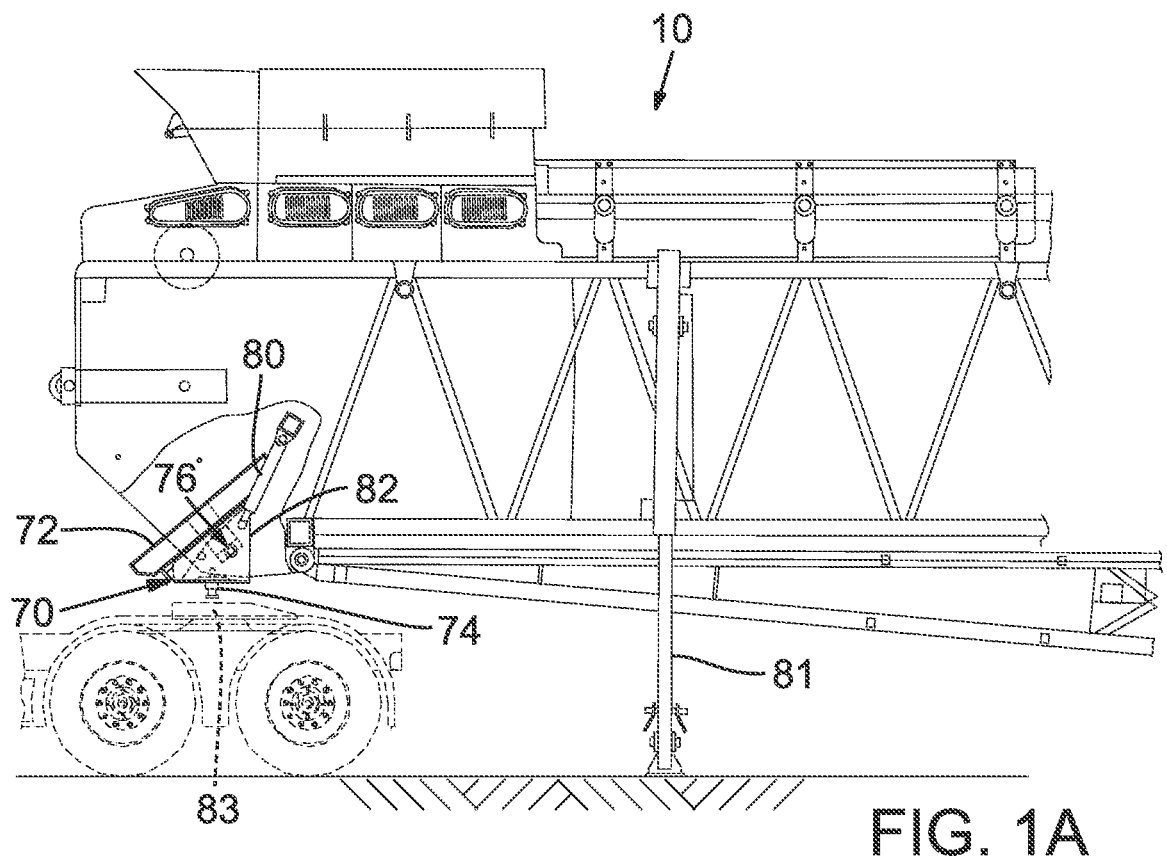
FIG. 1A is a side elevation view of a first embodiment of the rear of a radial stacker with a king pin in position to be mounted to the fifth wheel of a tractor, with a jack supporting the end of the stacker at an appropriate height to facilitate the mounting operation.
Figure 1B:
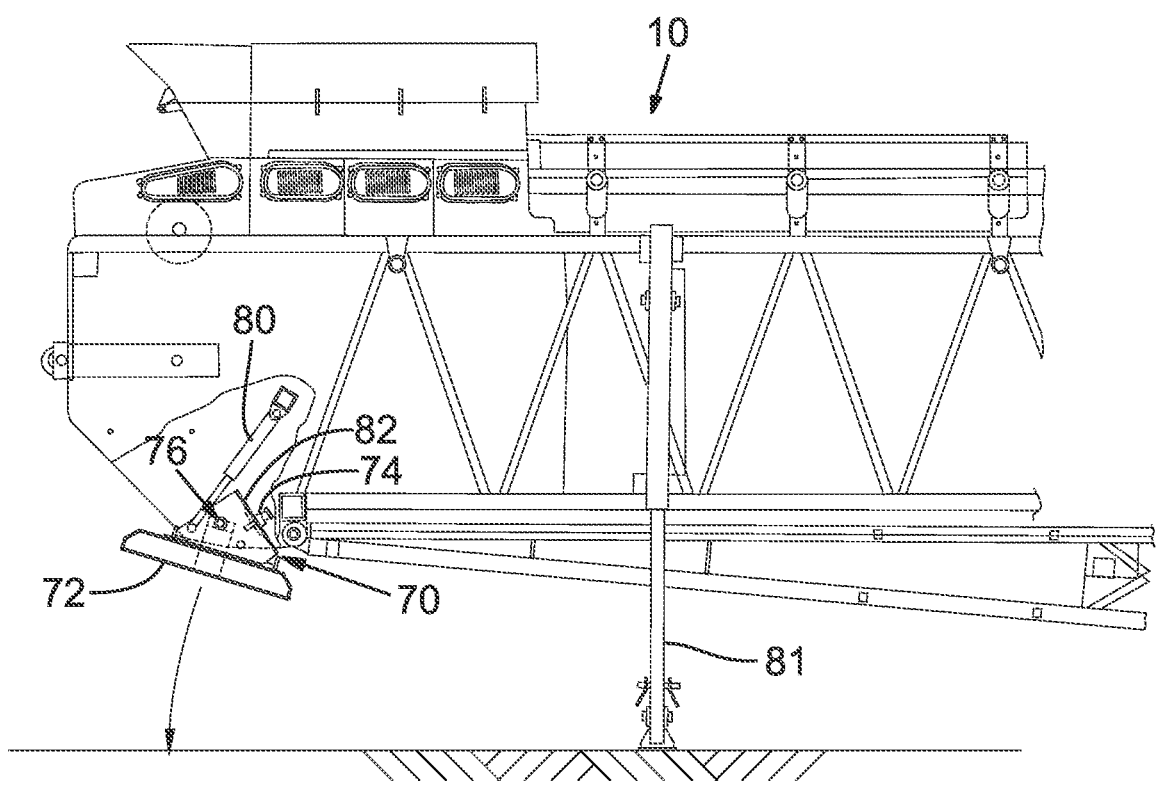
FIG. 1B is a side elevation view of the first embodiment of the rear of a radial stacker with the pivot pad having been rotated to its face-down position such that the pivot pad is ready to be lowered to the ground.
Figure 1C:
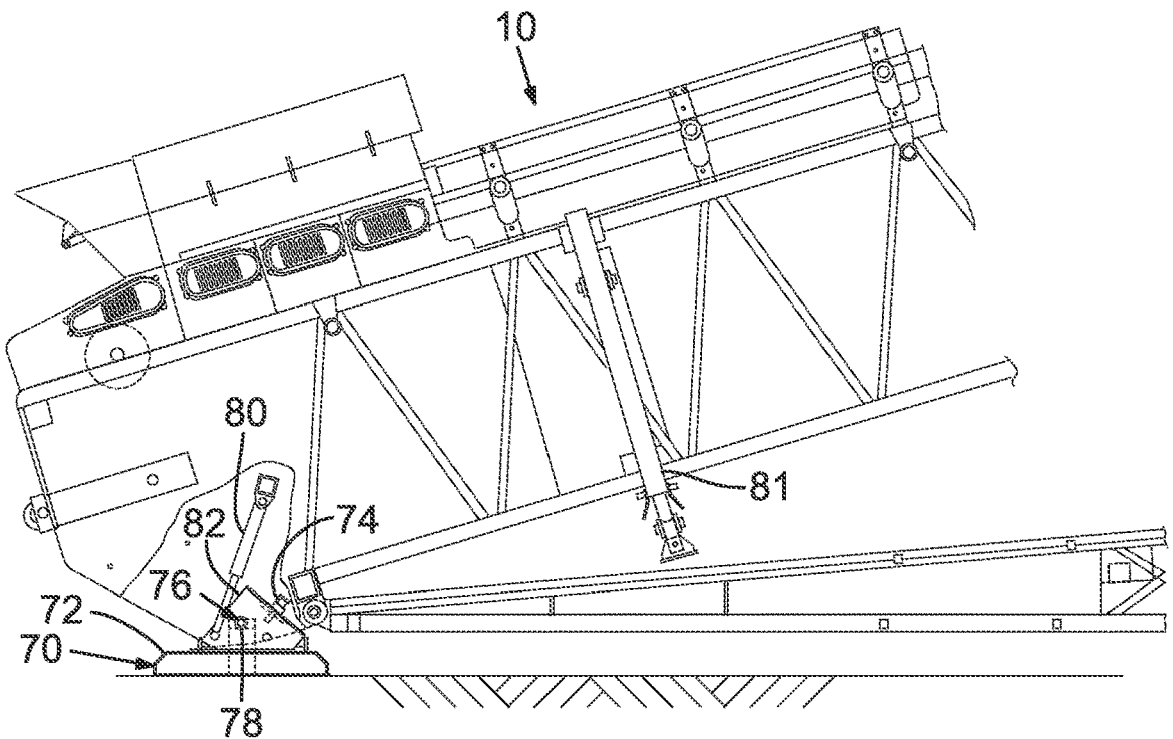
FIG. 1C is a side elevation view of the first embodiment of the rear of a radial stacker with the pivot pad having been lowered to the ground, ready for conveying operations.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments. However, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity. Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

A mobile radial stacker for stockpiling bulk material may be provided that includes a stacker frame, a linear conveyor mounted to the frame, the conveyor having a rear portion and a front portion and being designed to carry bulk material from a lower position adjacent the rear portion to a raised position adjacent the front portion. Also included may be a pair of wheels mounted to the frame to facilitate movement of the stacker around a work site and for movement to another work site, and a pivot pad/king pin apparatus mounted to the stacker including an integral king pin and pivot pad that may be displaced from a first position with the king pin facing downward for engagement with a tractor fifth wheel to a second position with the pivot pad facing downward for placement on the ground for radial conveying operations. The pivot pad/king pin apparatus may be rotatably mounted to the stacker such that the apparatus is rotated from the first position to the second position and vice versa.

The radial stacker may include a hydraulic system for displacing the pivot pad/king pin apparatus between the first and second positions. It may also include a lock pin extending between a body of the apparatus and the stacker that locks the pivot pad/king pin apparatus in one of the positions.

The radial stacker may also include a system for remotely actuating the lock pin to facilitate remote unlocking and locking of the lock, and/or for remotely actuating the hydraulic system to displace the pivot pad/king pin apparatus between the first and second positions.

A pivot pad/king pin apparatus for use with a radial stacker may alternatively be provided, including a body with a king pin and pivot pad integrally mounted thereto, the apparatus being rotatable between a first position with the king pin facing downward for engagement with a tractor fifth wheel to a second position with the pivot pad facing downward for placement on the ground for radial conveying operations.

The apparatus may include a lock pin removably mounted to the body of the apparatus that locks the pivot pad/king pin apparatus in either the first or the second position. The lock pin may be mounted to the stacker to selectively lock the position of the apparatus with respect to the stacker, and may include a system for remotely actuating the lock pin to facilitate remote unlocking and locking of the lock pin.

The apparatus may also include a hydraulic system for powering the apparatus between the first and the second positions, and possibly a system for remotely actuating the hydraulic system to power the apparatus between the first and the second positions.

The figures depict an integral apparatus including both a pivot pad and a king pin, each of which may selectively be placed in an operational position. In the embodiment indicated generally at 70 in FIGS. 1A-C and 2, a pivot pad 72 is provided on one side and a king pin 74 is provided on another side. These components might be positioned 180 degrees apart on opposite sides of the apparatus but in the depicted embodiments, the pivot pad and king pin, 72 and 74, respectively, in FIGS. 1A-C and 2, are disposed about 300 degrees apart. As shown best in enlarged FIG. 2, in addition to pivot pad 72 and king pin 74, apparatus 70 may include a rotation point 76 with a bearing 78 about which the apparatus may rotate.

A pivot pad/king pin hydraulic cylinder 80 is included in this embodiment that extends between a body 82 of the apparatus and the stacker, being eccentrically mounted with respect to rotation point 76 such that extension and retraction of hydraulic cylinder 80 causes apparatus 70 to rotate about the rotation point. A lock pin 84 and complementing aperture 86 may be included to permit the apparatus to be locked into a position with king pin 74 disposed to engage the fifth wheel 83 of a tractor for transport.

A second aperture may be included (but is not depicted) to permit apparatus 70 to be locked into a position with pivot pad 72 disposed to engage the ground. However, this second aperture is typically not included. Given differences in the slope of the terrain, it may be desirable for the pivot pad to move ever so slightly as stacker 10 is radially adjusted. In any event, lock pin 84 may be manually manipulated from a disengaged position to an engaged position and vice versa or by some sort of automated system, which might be as simple as a hydraulically extended cylinder (not shown). This automated system may be integrated into an automated system for extending and retracting pivot pad/king pin hydraulic cylinder 80 so that, in order to rotate the position of apparatus 70, a single control might be operated to disengage lock pin 84 and, once disengaged, to rotate the position of apparatus 70.

Figure 2:
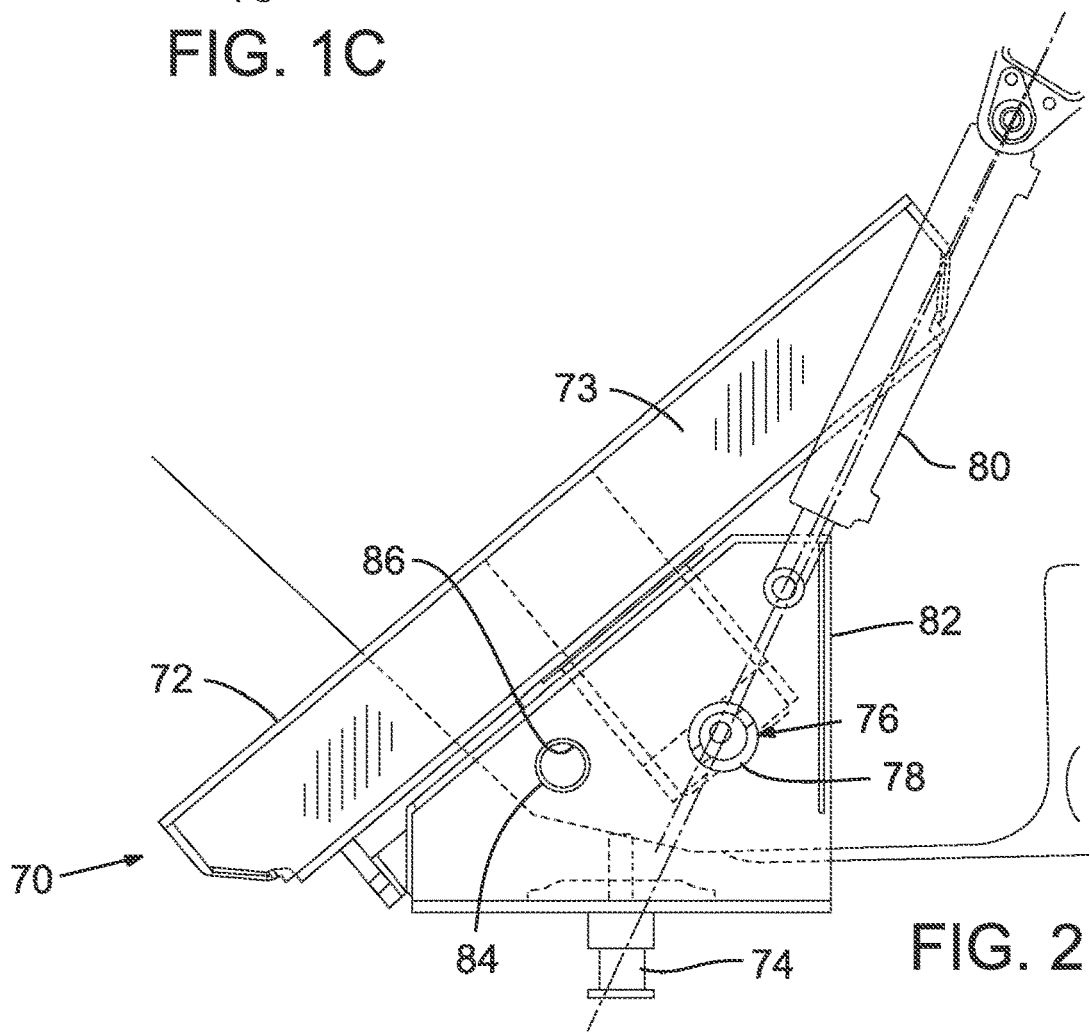
FIG. 2 is an enlarged side elevation view of the first embodiment, with the king pin in its face-down position, corresponding to that in FIG. 1.

Pivot pad 72 is depicted in FIG. 2 as being filled with a heavy material 73, although that is an optional feature that would not be included in many applications. An example of one such material is concrete, but other materials such as lead might be possible in some applications. This may be a desirable feature in certain settings as it might add stability to the pivot pad during various operations. Adding weight like this to the pivot pad may not be possible if the pivot pad was simply stored for manual manipulation as in conventional stackers.

A jack 81 may be included to facilitate the raising and lowering of the rear portion of the stacker. Jack 81 is typically provided with a hydraulic cylinder system (not shown) to power this process. The jack is shown in an extended position in FIGS. 1A and B so the rear portion is in position to be mounted to fifth wheel 83 and in a retracted position in FIG. 1C when pivot pad 72 has been lowered to the ground.

Figure 3A:
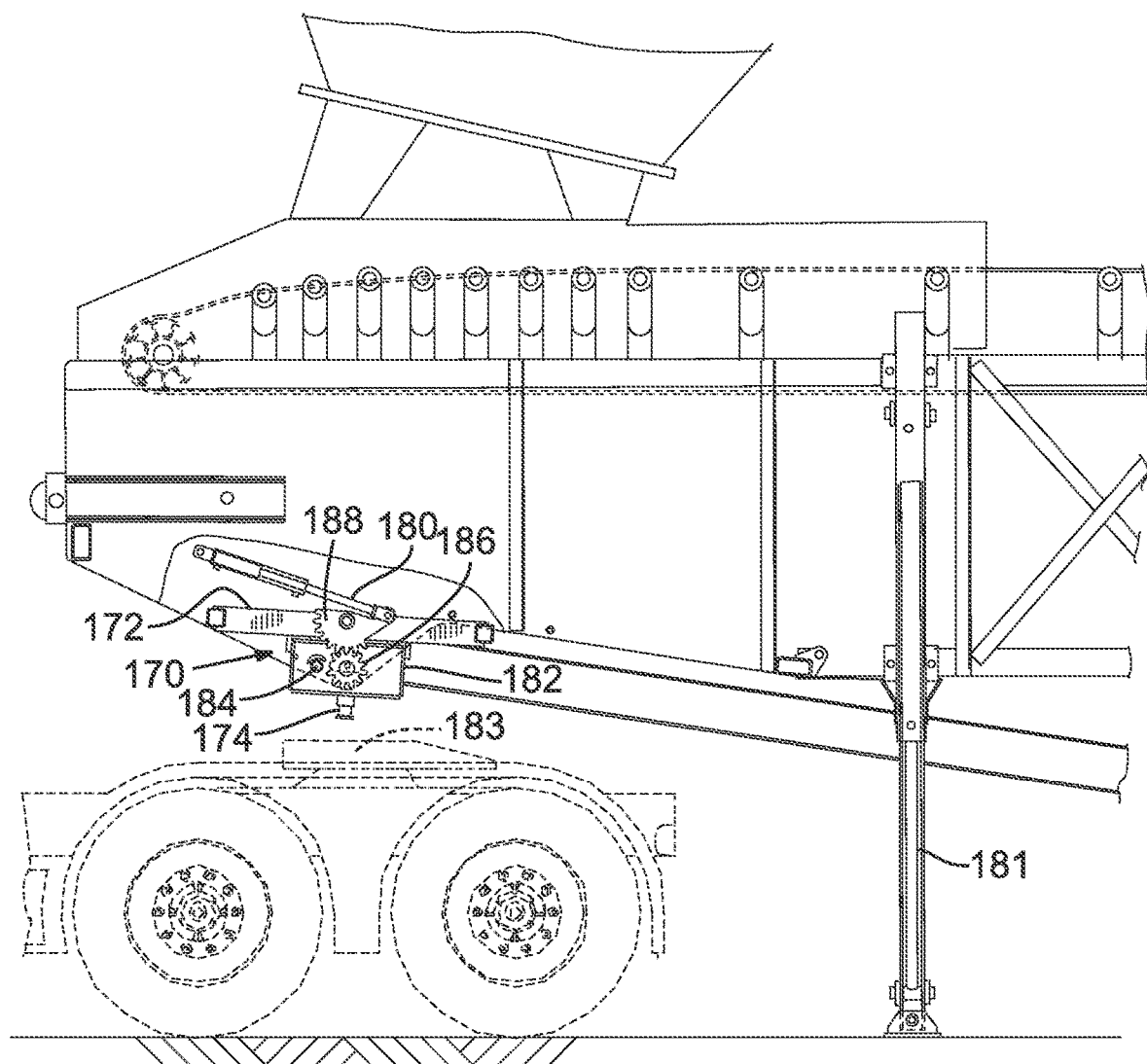
FIG. 3A is a side elevation view of a second embodiment of the rear of a radial stacker with a king pin in position to be mounted to the fifth wheel of a tractor, with a jack supporting the end of the stacker at an appropriate height to facilitate the mounting operation.
Figure 3B:
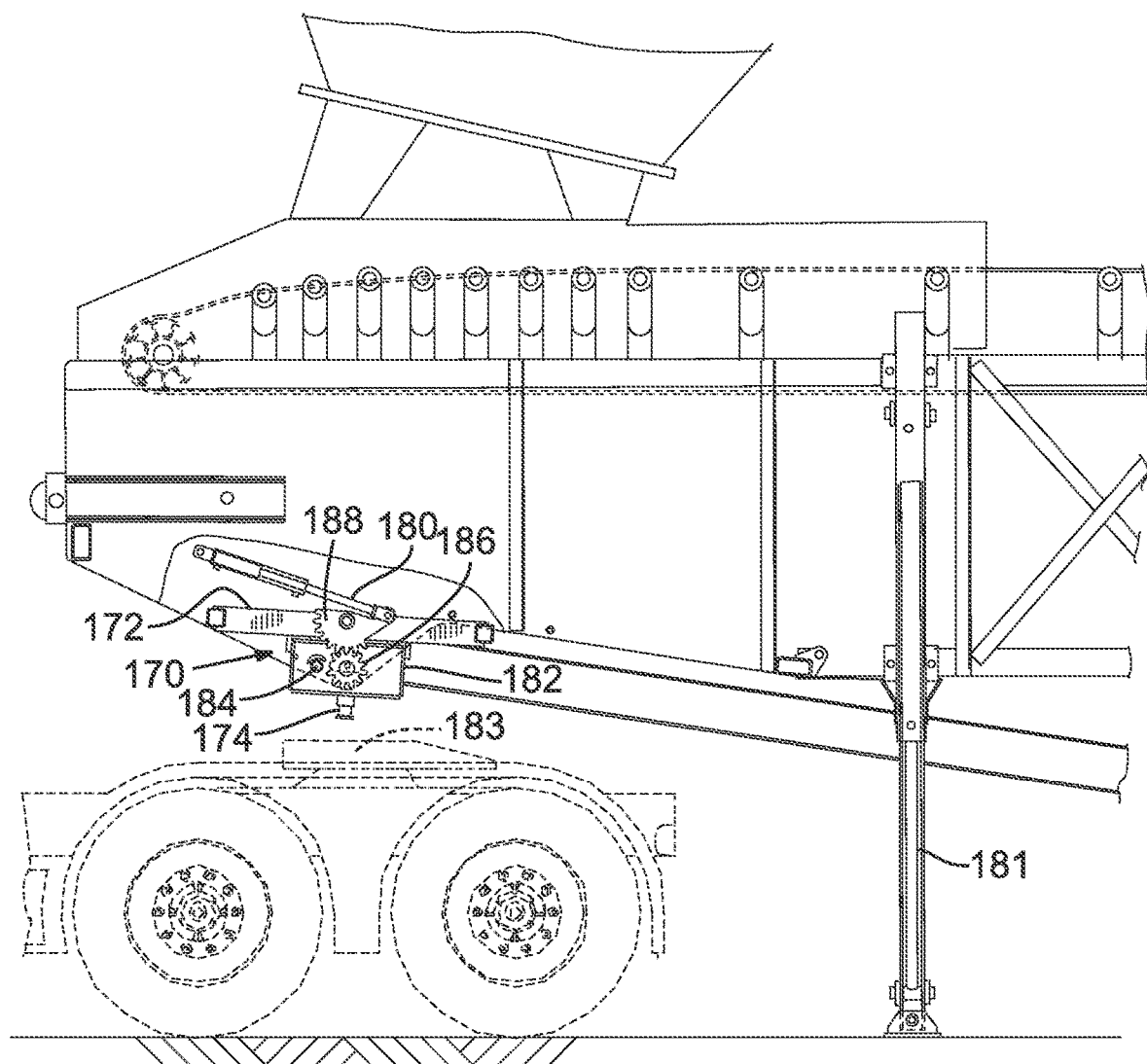
FIG. 3B is a side elevation view of the second embodiment of the rear of a radial stacker with the pivot pad having been rotated to its face-down position and having been lowered to the ground, ready for conveying operations.
Figure 3C:
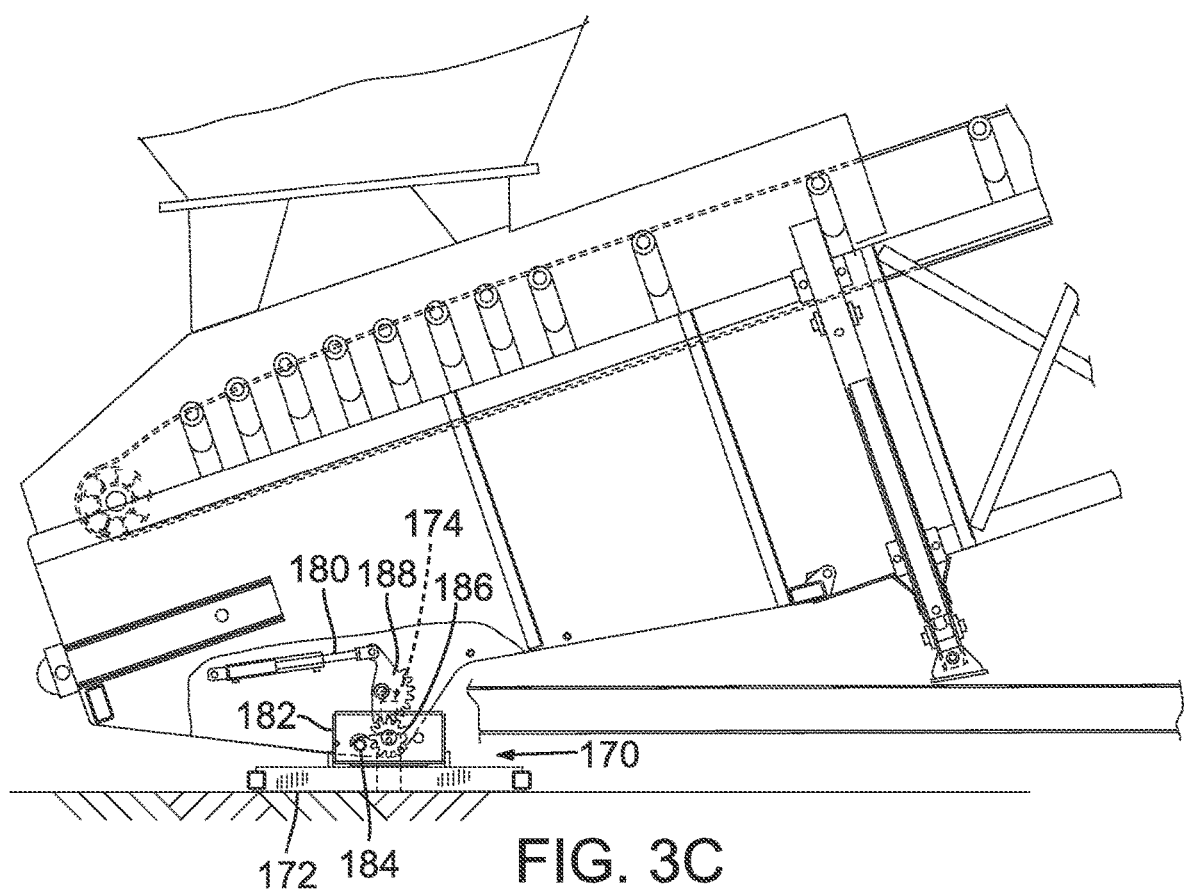
Figure 4A:
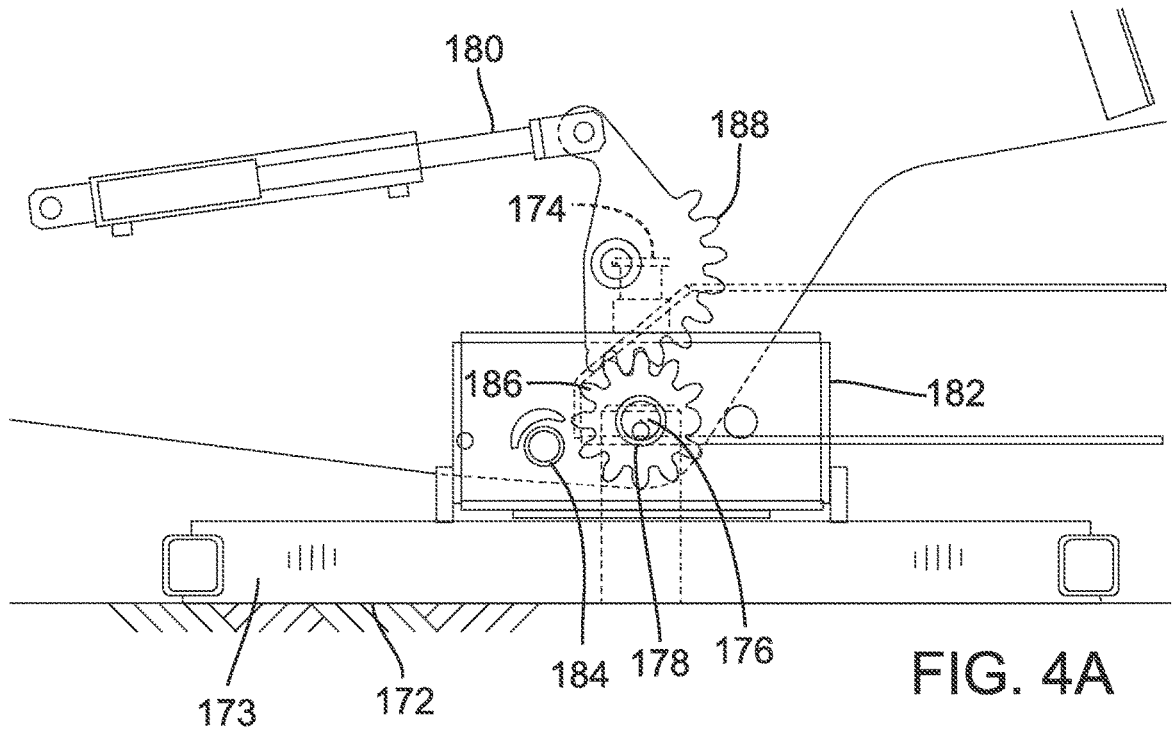
FIG. 4A is an enlarged side elevation view of the second embodiment corresponding to FIG. 3B with the pivot pad having been rotated to its face-down position and lowered to the ground, ready for conveying operations.
Figure 4B:
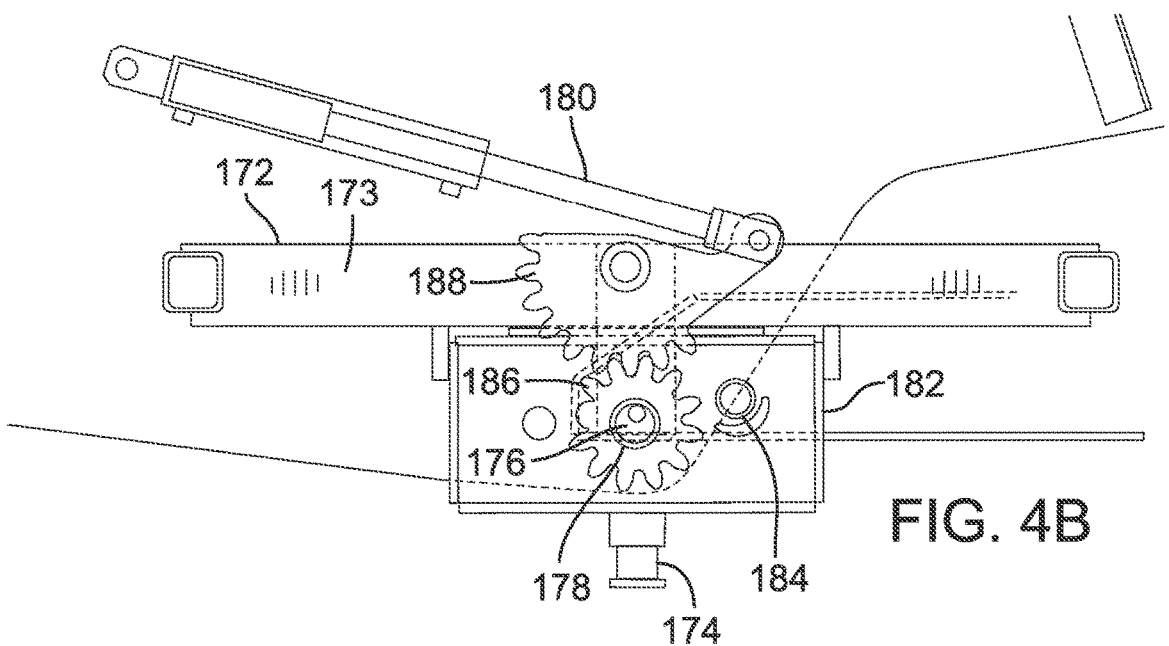
FIG. 4B is an enlarged side elevation view of the second embodiment, with the king pin in its face-down position, corresponding to the position in FIG. 3A, ready to be mounted to the fifth wheel of a tractor.

FIGS. 3A and B, 4A and B include another embodiment of apparatus, which is generally identified at 170, and that includes pivot pad 172, king pin 174, rotation point 176 with bearing 178, hydraulic cylinder 180, body 182, and lock pin 184. Also included is pinion 186, which is driven by gear 188. The rotational position of apparatus 170 is controlled by hydraulic cylinder 180, which controls the position of gear 188 and that in turn controls the position of pinion 186 and pivot pad 172 and king pin 174 as the apparatus rotates around rotation point 176. Lock pin 184 may be provided to selectively lock apparatus 170 in one of two rotational positions, either with pivot pad 172 or king pin 174 in a downward-facing position. These positions are depicted in FIGS. 4A and B, respectively. As with apparatus 70, pivot pad 172 of apparatus 170 may be filled with a heavy substance such as concrete 173 (see FIG. 4A) to assist in stabilizing the pad. A jack 181 may be provided to raise and lower the rear portion of the stacker to prepare king pin 174 to mount to a fifth wheel 183 or to position pivot pad 172 on the ground.

Figure 5A:
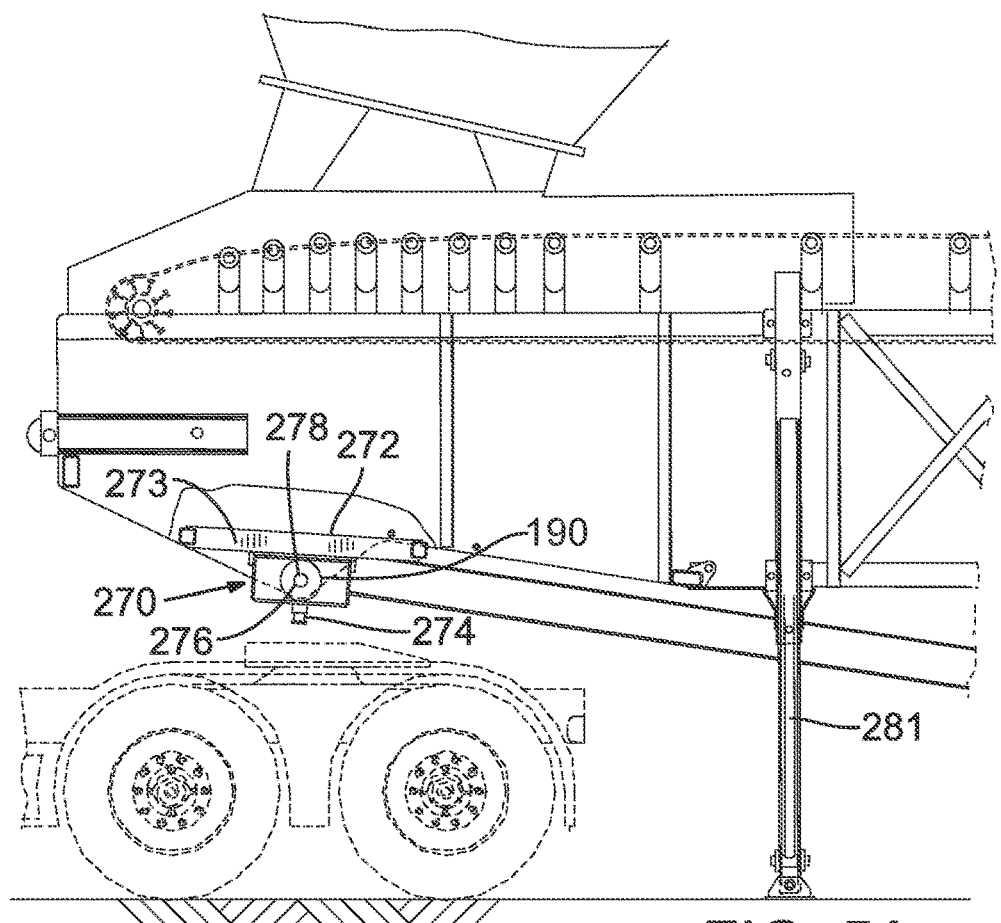
FIG. 5A is a side elevation view of a third embodiment with the king pin in its face-down position to be mounted to the fifth wheel of a tractor.
Figure 5B:
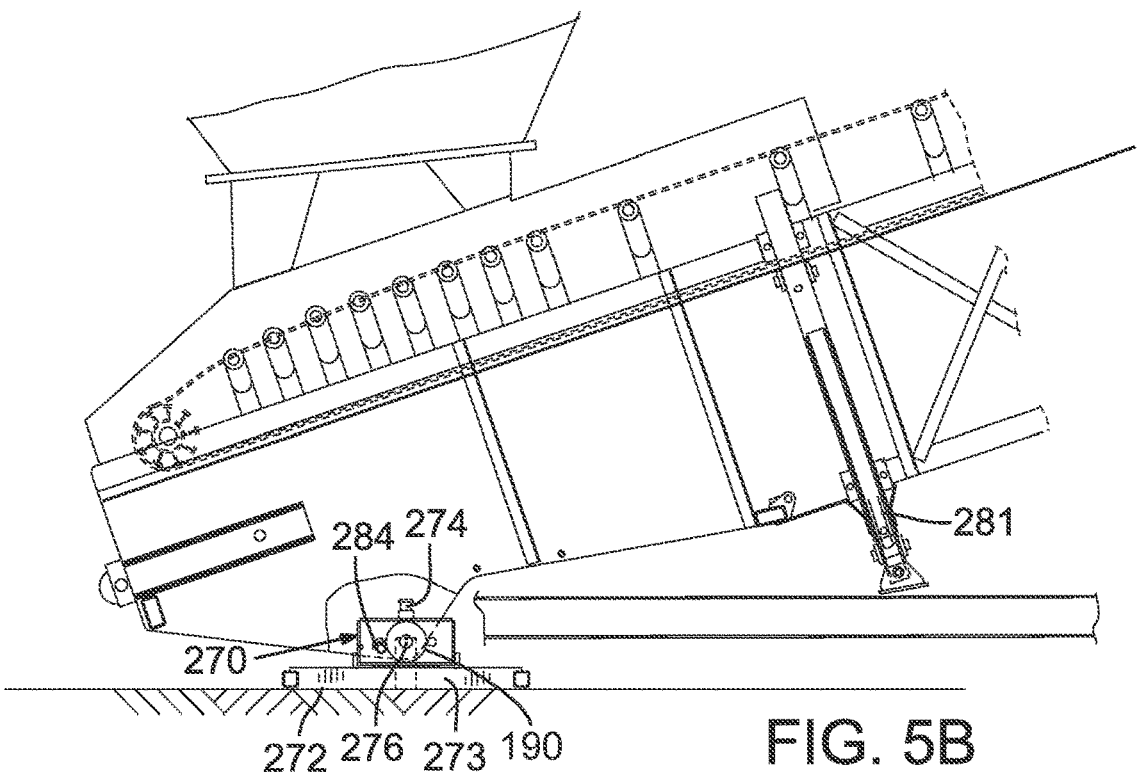
FIG. 5B is a side elevation view of the third embodiment with the pivot pad in its face-down position and lowered to the ground, ready for conveying operations.

FIGS. 5A and B depict a third embodiment of the apparatus for controlling the position of the pivot pad and king pin. This third embodiment, identified generally at 270, includes pivot pad 272, king pin 274, rotation point 276 with bearing 278, body 282 and lock pin 284. What differentiates apparatus 270 is that in place of a hydraulic cylinder 80 or 180, the apparatus includes a motor 190. Motor 190 will typically be a hydraulic motor but it might be an electric or other motor. In any event, motor 190 may provide the power to rotate body 282, pivot pad 272 and king pin 272 from a first position with the king pin facing downward shown in FIG. 5A to a second position with the pivot pad facing downward shown in FIG. 58. Again, pivot pad 272 may be filled with concrete or another heavy substance to help stabilize the pad. As with the other embodiments, a jack 281 may be provided to raise and lower the rear portion of the stacker.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A mobile radial stacker for stockpiling bulk material, comprising:
   a stacker frame;
   a linear conveyor mounted to the frame, the conveyor having a rear portion and a front portion and being designed to carry bulk material from a lower position adjacent the rear portion to a raised position adjacent the front portion;
   a pair of wheels mounted to the frame to facilitate movement of the stacker around a work site or to another work site; and
   a pivot pad/king pin apparatus mounted to the stacker including an integral king pin and pivot pad that may be displaced from a first position with the king pin facing downward for engagement with a tractor fifth wheel to a second position with the pivot pad facing downward for placement on the ground for radial conveying operations.

2. The radial stacker of claim 1, wherein the pivot pad/king pin apparatus is rotatably mounted to the stacker such that the apparatus is rotated from the first position to the second position and vice versa.

3. The radial stacker of claim 2, wherein the pivot pad is filled with a heavy substance to stabilize the pivot pad.

4. The radial stacker of claim 2, wherein a hydraulic cylinder powers the displacement from the first position to the second position.

5. The radial stacker of claim 2, wherein a hydraulic motor powers the displacement from the first position to the second position.

6. The radial stacker of claim 2, further comprising a lock pin extending between a body of the apparatus and the stacker that locks the pivot pad/king pin apparatus in one of the positions.

7. The radial stacker of claim 6, further comprising a system for remotely actuating the lock pin to facilitate remote unlocking and locking of the lock.

8. The radial stacker of claim 2, further comprising a system for powering displacement between the first and the second positions, and including a system for remotely actuating the system for powering displacement between the first and second positions.

9. A pivot pad/king pin apparatus for use with a radial stacker, including a body with a king pin and pivot pad integrally mounted thereto, the apparatus being rotatable between a first position with the king pin facing downward for engagement with a tractor fifth wheel to a second position with the pivot pad facing downward for placement on the ground for radial conveying operations.

10. The apparatus of claim 9, further comprising a lock pin removably mounted to the body of the apparatus that locks the pivot pad/king pin apparatus in either the first or the second position.

11. The apparatus of claim 10 wherein the lock pin is mounted to the stacker and selectively locks the position of the apparatus with respect to the stacker.

12. The apparatus of claim 11, further comprising a system for remotely actuating the lock pin to facilitate remote unlocking and locking of the lock pin.

13. The apparatus of claim 9, further comprising a hydraulic system for powering the apparatus between the first and the second positions.

14. The apparatus of claim 13, further comprising a system for remotely actuating the hydraulic system to power the apparatus between the first and the second positions.

* * * * *